United States Patent [19]

Dreveny

[11] Patent Number: 5,228,256

[45] Date of Patent: Jul. 20, 1993

[54] ANCHOR MEANS AND APPARATUS FOR INSTALLING SAME

[76] Inventor: Ross Dreveny, 1168 Stavebank Road, Mississauga, Ontario, Canada, L5G 2V2

[21] Appl. No.: 769,706

[22] Filed: Oct. 2, 1991

[51] Int. Cl.$^5$ .............................................. E04C 5/12
[52] U.S. Cl. ...................................... 52/543; 227/19; 227/179
[58] Field of Search ...................... 227/19, 179; 52/543

[56] References Cited

U.S. PATENT DOCUMENTS

| | | | |
|---|---|---|---|
| 960,300 | 6/1910 | Fischer | 227/19 |
| 4,728,020 | 3/1988 | Green et al. | 227/19 |
| 4,732,308 | 3/1988 | Grieshaber | 227/19 |
| 4,741,336 | 5/1988 | Failla et al. | 227/19 |
| 4,749,114 | 6/1988 | Green | 227/19 |

Primary Examiner—Carl D. Friedman
Assistant Examiner—Wynn E. Wood

[57] ABSTRACT

An anchor for use in association with a support structure, specifically metal tin pan decking, and an apparatus for installing the same. The anchor comprises a V-shaped member having diverging arms; and a gripping projection disposed proximate the end of each arms. The arms and projections are aligned in the same plane and the projections preferably extend inwardly and downwardly towards the apex of the V-shaped member. The apparatus comprises supports mounted on a shaft, the supports being adapted to hold an anchor therein. Levers, engageable with the supports at one end and a gearing mechanism at the other end, permit the user to release the anchor from the supports. The shaft is extended to reach the U-shaped tracks of the tin pan decking and the projections are disposed on either side of the desired track. The anchor is released from the supports so that the projections pierce the track. The apparatus is then removed and reloaded with the next anchor to be installed.

12 Claims, 11 Drawing Sheets

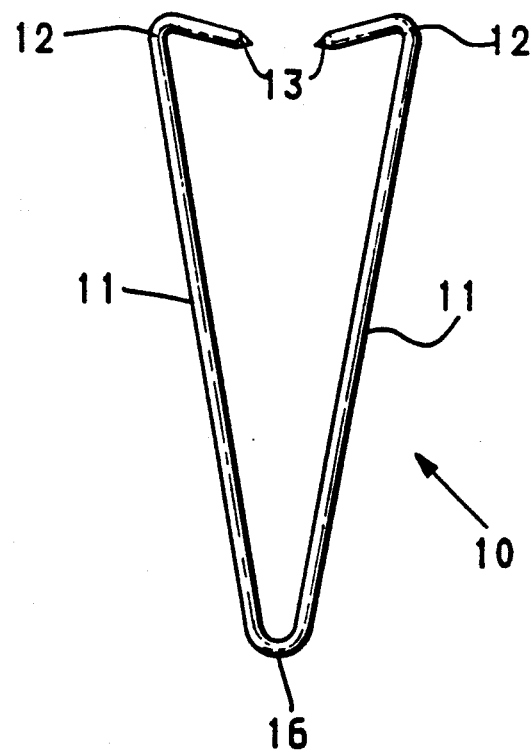
FIG. 1
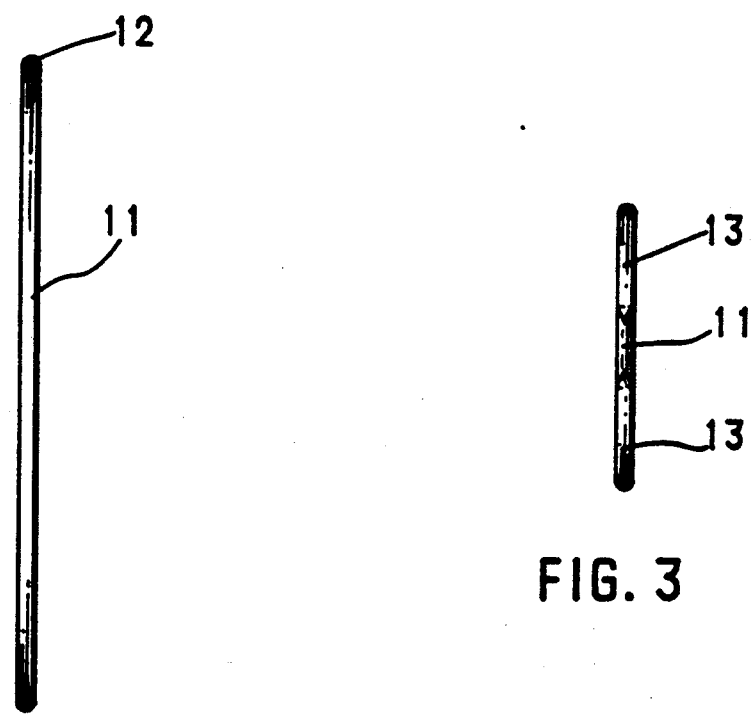
FIG. 2
FIG. 3

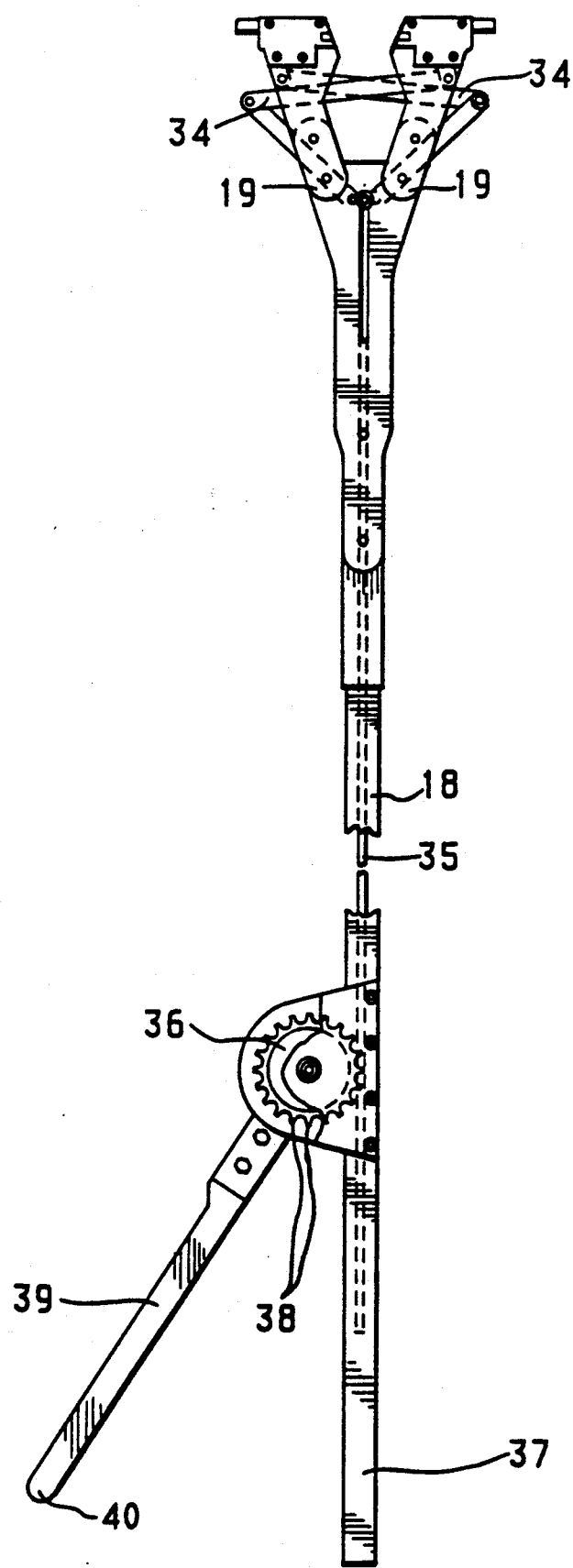
FIG. 6.A.

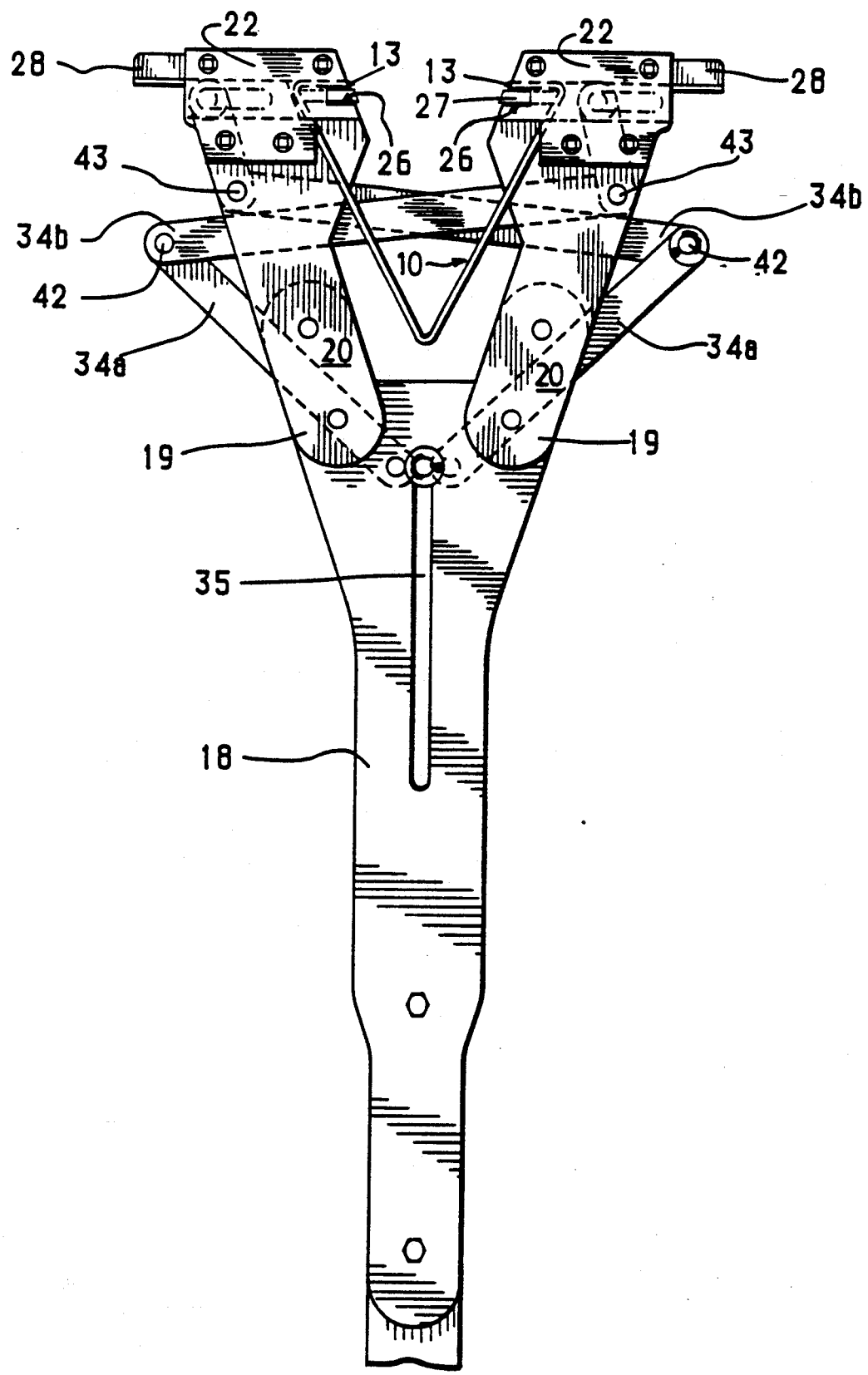
FIG. 6.B.

ANCHOR MEANS AND APPARATUS FOR INSTALLING SAME

BACKGROUND OF THE INVENTION

This invention relates generally to an anchor means and an apparatus for installing the same, and more specifically to an anchor means which is installable in tin pan decking using said apparatus.

SUMMARY OF THE PRIOR ART

Tin pan decking is a type of corrugated metal support which is frequently used as a ceiling in warehouses and the like. When viewed in cross section, the decking comprises a plurality of substantially open-U-shaped members connected to each other by straight sections. The straight sections join the ends of the upwardly extending arms of adjacent U-shaped members together. From below, the decking has the appearance of a plurality of substantially parallel tracks.

A variety of fixtures may be suspended from the decking. These include lighting, piping, ductwork, suspended ceilings and the like. Anchor supports are connected to the decking to allow these fixtures to be suspended from the same. The anchor support presently used is a wire passed through the metal of the decking to from a loop. The fixture to be suspended from the decking is connected to the loop. The loop-type of support requires that a workman get up close to the decking and drill or punch holes through the two upwardly extending arms of the U-shaped member. It will be obvious that lining up the holes on either side of the U-shape creates a variety of problems, especially when a workman is working from the top of a ladder. Seeing as tin pan decking is frequently disposed approximately 20 feet above ground level, installing the anchor support from the top of a ladder is fairly dangerous. The installation is also time consuming.

It is therefore an object of the present invention to provide an improved anchor means for tin pan decking.

It is a further object of the present invention to provide an anchor means for tin pan decking which can be relatively easily and quickly installed in the decking and which can be installed from floor or ground level.

It is a further object of the present invention to provide an apparatus for installing this improved anchor means.

SUMMARY OF THE INVENTION

The anchor means of the present invention comprises a substantially V-shaped member having diverging arms. Each arm extends to an end and gripping means are disposed proximate the end of each arm for engaging a supporting structure. When the anchor means is installed in the supporting structure, the shape of the member and the action of the gripping means substantially prevent the anchor means from being withdrawn therefrom.

The gripping means is inclined at an angle to the arms of the V-shaped member which is sufficient to substantially prevent the anchor means pulling free when a load is attached to the V-shaped member. In the preferred embodiment of the invention, the gripping means comprises a projection which extends from the end of each arm. The projections extend towards each other, and the projections and arms of the V-shaped member are substantially aligned in the same plane. The projections may extend from the end of each arm substantially inwardly and downwardly towards the apex of the V-shaped member. A barb may also be disposed upon the gripping means to further engage the tin pan decking.

In the preferred embodiment of the invention the projections are integral with the arms of the V-shaped member.

The apparatus of the present invention comprises a shaft having a grasping means mounted at one end thereof, said grasping means being configured to hold said anchor means therein. An anchor disengagement means is mounted on the shaft and is adapted to engage the grasping means to cause the anchor means to be released therefrom.

In the preferred embodiment of the invention the grasping means comprises two support members disposed a spaced distance from each other in the same plane, each support member having a slot therein for receiving the arms and/or gripping means of an anchor means. The slots are so disposed that when an anchor means is held by the grasping means, the anchor means lies substantially parallel to the plane of the support members. A securing means is mounted on each of the support members, the securing means being adapted to releasably engage an arm and/or gripping means of an anchor means disposed within the slot.

BRIEF DESCRIPTION OF THE DRAWINGS

The preferred embodiment of the invention will now be described with the aid of the following drawings, in which;

FIG. 1 is a front view of an anchor means in accordance with the present invention;

FIG. 2 is a side view of the anchor means shown in FIG. 1;

FIG. 3 is a plan view of the anchor means shown in FIG. 1;

FIG. 6A is a front view of an apparatus for installing the anchor means in tin pan decking; FIG. 6B is a front view of the head of the apparatus of FIG. 6A being shown with an anchor clamped therein;

DETAILED DESCRIPTION OF THE PREFERRED EMBODIMENT

Figure 4:
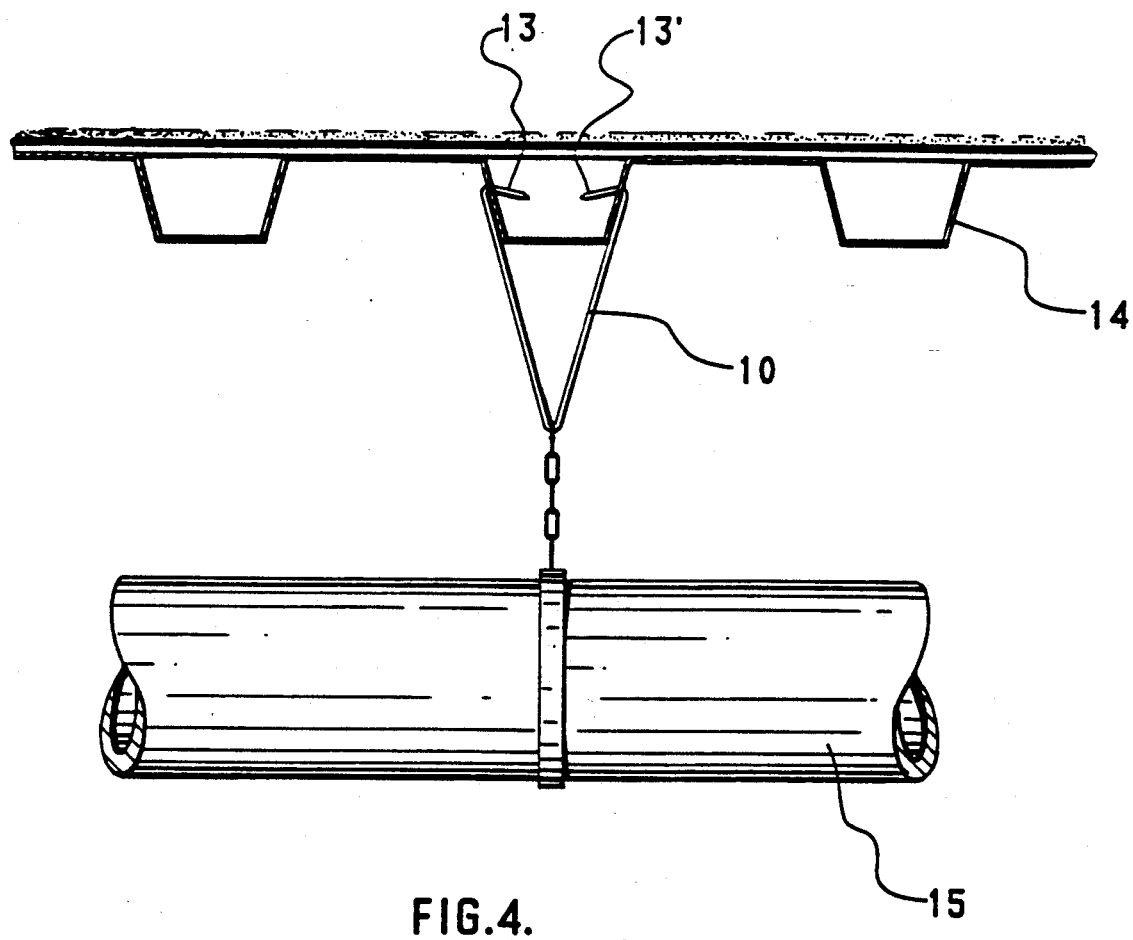
FIG. 4 is a side view showing the anchor means connected to the tin pan decking.

Referring to FIGS. 1-4, the anchor of the present invention, generally referred to as 10, comprises a substantially V-shaped member having diverging arms 11. Each arm 11 extends to an end 12, and a projection 13 is disposed proximate the end 12 of each arm. When the anchor 10 is installed in tin pan decking 14 (FIG. 4), the shape of the anchor and action of the projections 13 substantially prevent the anchor from being withdrawn from the tin pan decking.

Figure 5:
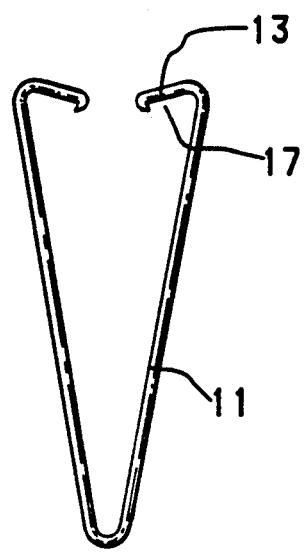
FIG. 5 is a front view of an alternative embodiment of an anchor means in accordance with the present invention.

The projections 13 are inclined at an angle to the arms 11 sufficient to substantially prevent the anchor 10 from pulling free from the tin pan decking 14 when a load 15 is attached to the anchor. Such loads 15 may include ducts, pipes or electrical fixtures. The projections 13 preferably extend towards each other substantially inwardly and downwardly towards the apex 16 of the V-shaped member, or may extend towards each other substantially horizontally. The projections 13 and arms 11 of the anchor are substantially aligned in the same plane. The projections 13 are sharp so that they are able to pierce the metal of the tin pan decking 14. The projections 13 may further include a barb 17 (FIG. 5) to assist in preventing the disengagement of the anchor from the tin pan decking 14.

The anchor is preferably manufactured from metal such as oil tempered spring wire, and is preferably manufactured as an integral unit.

The apparatus for installing the anchor is shown in FIGS. 6-12.

The apparatus comprises a shaft 18 which has a head disposed at one end. The shaft 18 is preferably manufactured so that it telescopes in a suitable manner. Alternatively, the shaft 18 may be manufactured from a plurality of sections which can be connected together in such a manner as to create a shaft of a desired length, or a plurality of shafts of different lengths may be selectively attached to the head.

Figure 8:
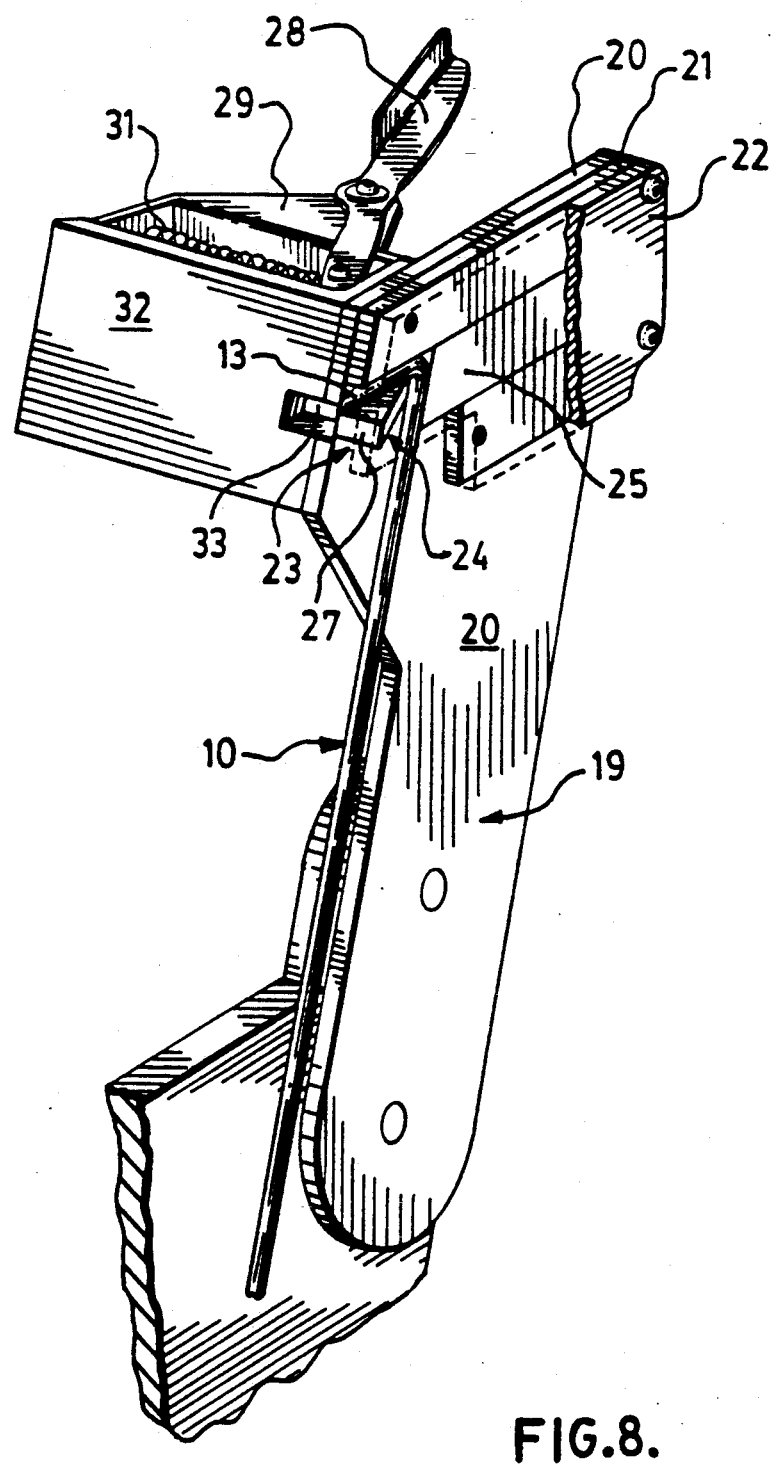
FIG. 8 is a perspective view of the part of the head of the apparatus.
Figure 9:
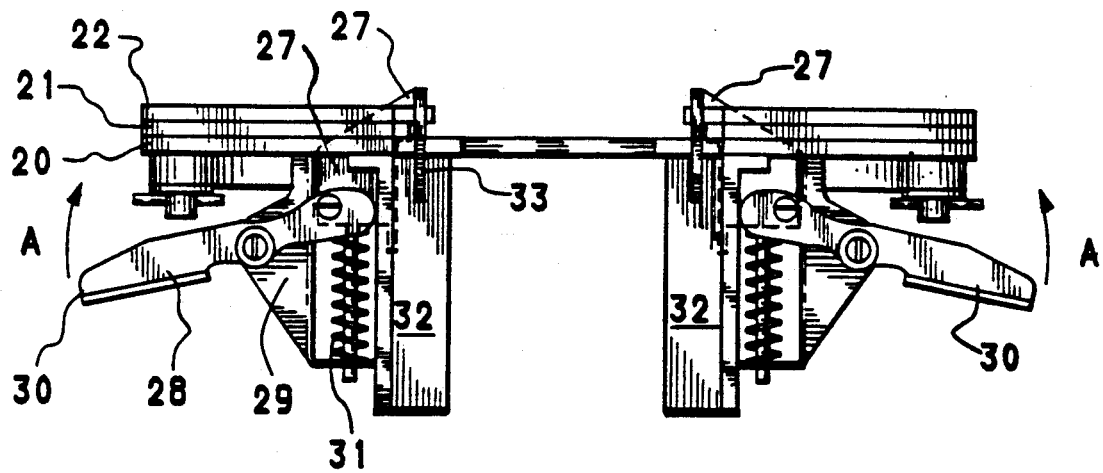
FIG. 9 is a plan view of the head of the apparatus.
Figure 10:
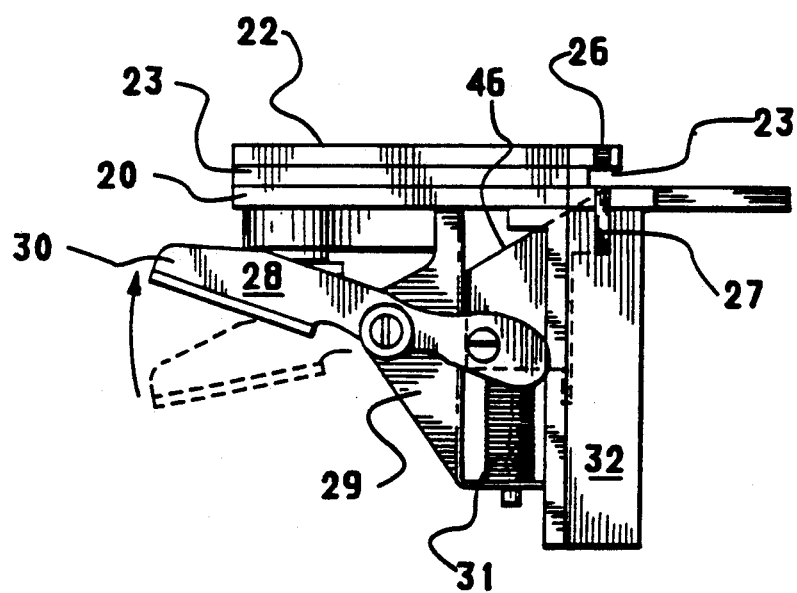
FIG. 10 is plan view of one side of the head of the apparatus showing the movement of the latch when the lever arm is moved towards the first plate of the supports.
Figure 11:
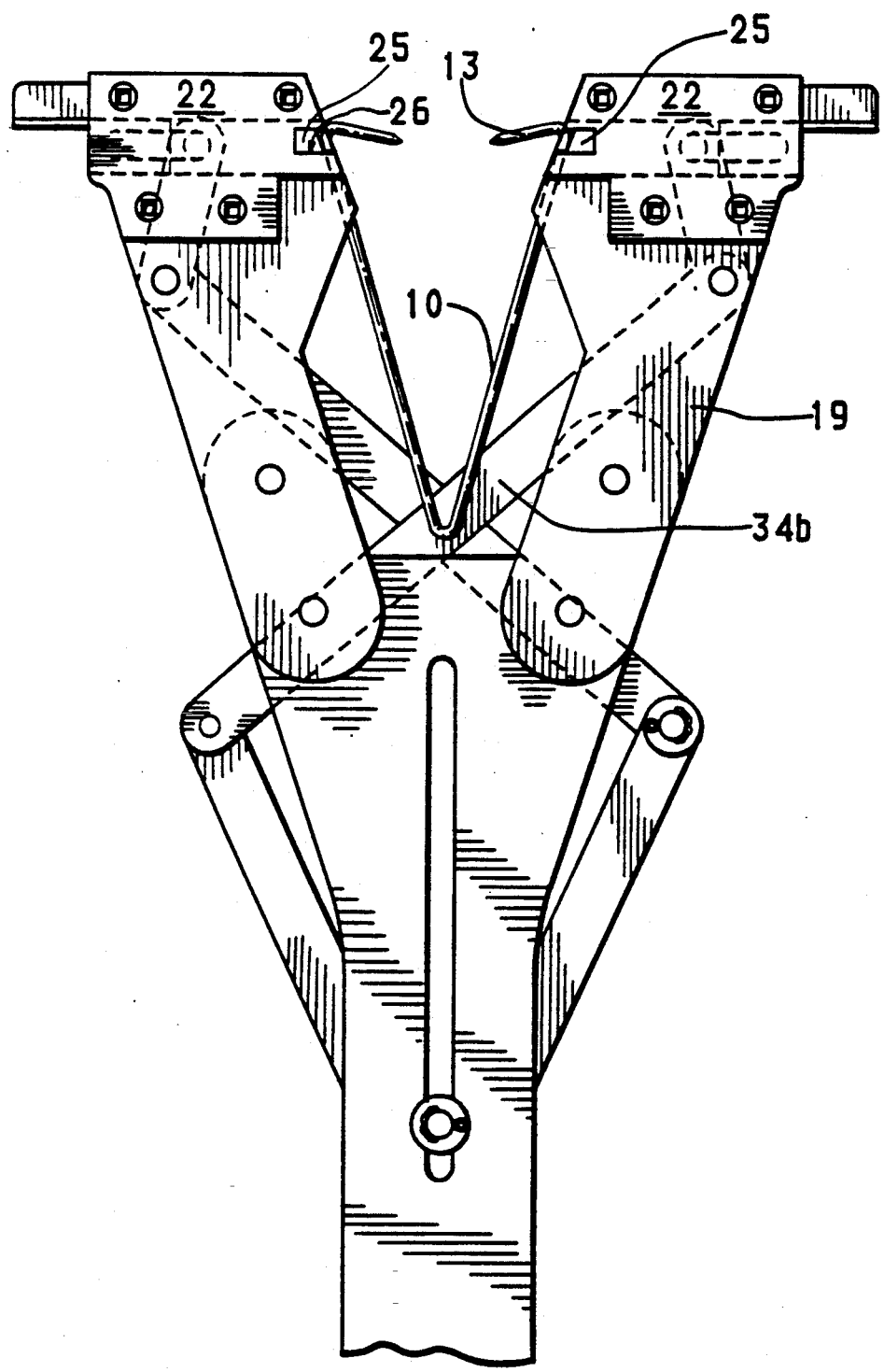
FIG. 11 is a front view of the head of the apparatus showing the anchor being released therefrom.

Referring to FIGS. 8-10, the head comprises two supports 19 which are disposed a spaced distance from each other in the same plane. Each support 19 is comprised of first, second and third plates 20,21,22. The first plate 20 is fixedly attached to the shaft 18, and the second and third plates 21,22 are fixedly attached to the first plate 20 in such a manner that the second plate 21 is disposed between the first and third plates 20,22. The first, second and third plates are substantially parallel to each other and they preferably abut one another. The second plate 21 is the smallest of the three, and the third plate 22 is larger than the second plate 21, but smaller than the first plate 20. A slot 23 is therefore formed between the first and third plates 20,22.

The second plate 21 has a hole 24 disposed therein, the hole 24 being adapted to receive a plunger 25 therein. The second plate 21 has faces (not shown) which are substantially parallel to and which abut the first and third plates 20,22. The hole 24 is disposed through these faces. The plunger 25 is disposed in substantially the same plane as the second plate 21 and is movable within the hole 24. The second plate 21 may comprise two smaller plates (not shown) which are disposed a spaced distance from each other in the same plane, with the hole 24 being the spaced distance between the smaller plates.

The third plate 22 has an aperture 26 (FIGS. 6 and 11) disposed therein. The aperture 26 is co-incident with a portion of the hole 24, and both the aperture 26 and the coincident portion of the hole 24 are adapted to receive a latch 27 therethrough. The latch 27 is movably mounted substantially at right angles to the first plate 20 and is reciprocally movable through the coincident portion of the hole 24 and the aperture 26. The latch 27 is manually movable by depressing a pivoted lever arm 28 toward the first plate 20 of the support 19 in the direction of arrow A in FIG. 9. The lever arm 28 is pivotally mounted in a bracket 29 (FIG. 7) which is attached to the first plate 20. One end of the lever arm 28 engages the latch 27 and the other end 30 can be moved towards the first plate 20. As shown in FIG. 10, depression of the end 30 of the lever arm 28 toward the first plate 20 causes the latch 27 to be withdrawn from the aperture 26 and coincindent portion of the hole 24. The arm 11 and/or projection 13 of an anchor 10 may be then be inserted into the slot 23. when the end 30 of the lever arm 28 is released, the latch 27 is urged back towards the third plate 22 by a spring 31. The spring 31 is supported by a support plate 32 which is secured to the first plate 20. The support plate 32 has an aperture 33 to allow for movement of the latch 27. The release of the end 30 of the lever arm 28 clamps the arm 11 and/or projection 13 of the anchor 10 against the inside of the third plate 22 as shown in FIG. 6.

An anchor disengaging mechanism is connected to each support 19. A lever 34 is fixedly connected to each support 19 and a rod 35 connects the levers 34 to a gear 36 disposed proximate the base 37 of the shaft 18. The rod 35 is manufactured so that it telescopes or slides within the shaft 18. A sprocketed chain (not shown) is mounted on the rod 35 for meshing with the teeth 38 of the gear 36. A handle 39, attached to the gear 36, permits the user to actuate the gear 36. When the handle 39 is rotated so that its free end 40 moves towards the supports 19, the gear 36 pulls the sprocketed chain, and therefore the rod 35, downwardly towards the base 37 of the shaft 18. When the handle 39 is rotated so that its free end 40 moves towards the base 37 of the shaft 18, the gear 36 pushes the sprocketed chain, and therefore the rod 35, upwardly towards the supports 19. The rod 35 is therefore adapted for reciprocal movement along the longitudinal axis of the shaft 18.

Figure 7:
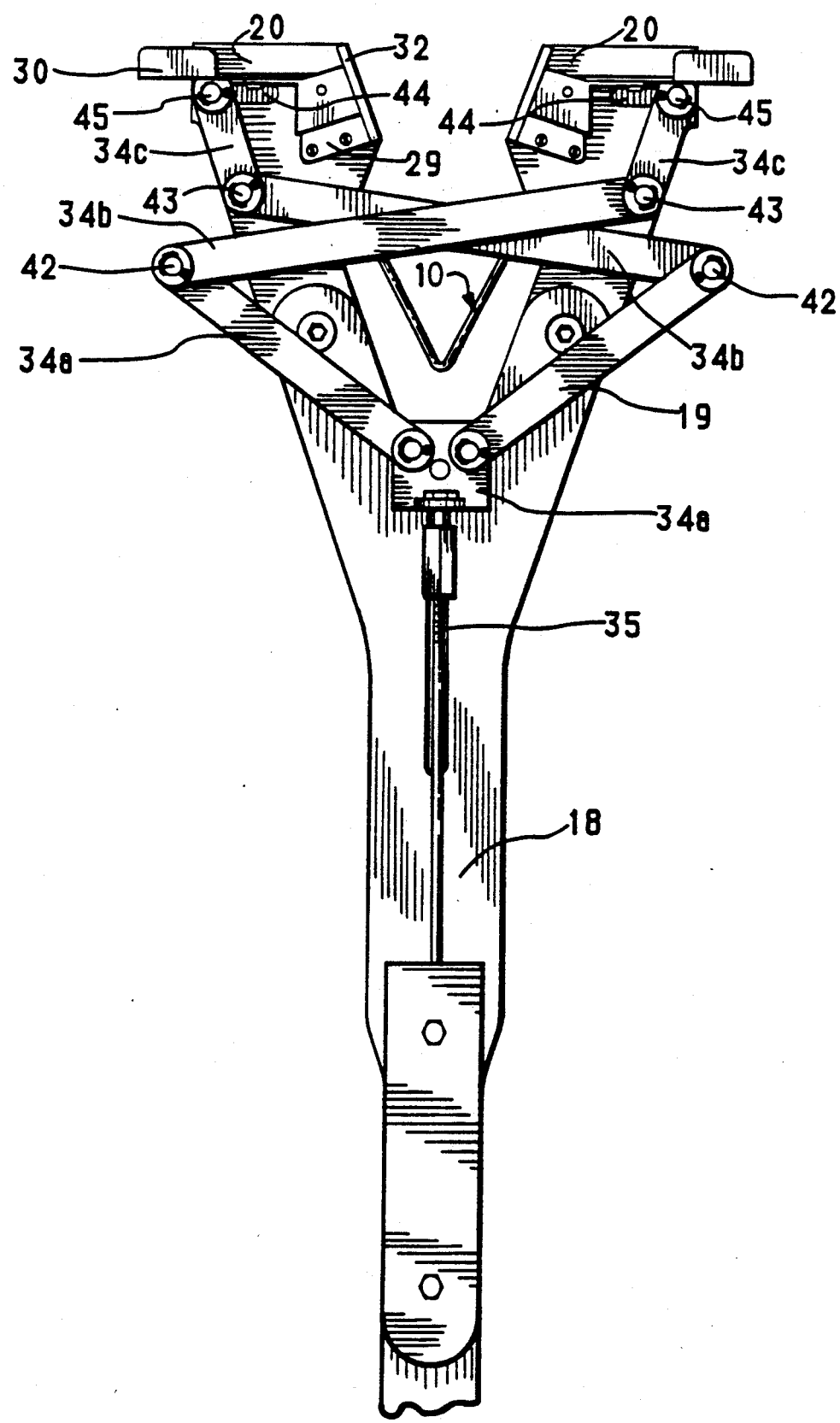
FIG. 7 is a rear view of the head of the apparatus shown in FIG. 6A, the apparatus being shown with an anchor being clamped therein.
Figure 12:
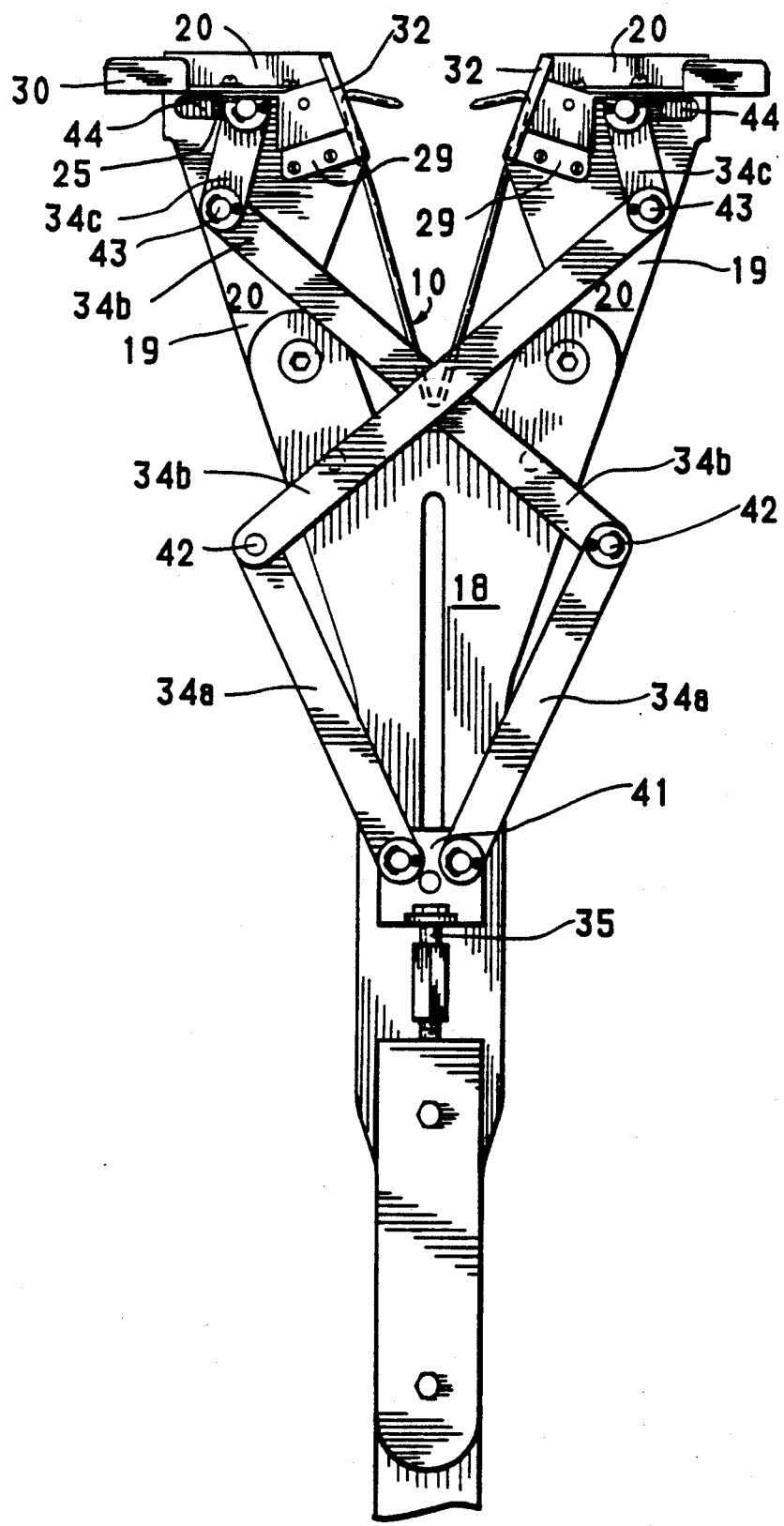
FIG. 12 is a rear view of the head of the apparatus showing the anchor being released therefrom.

The rod 35 is connected via a slidable connection plate 41 (FIG. 7) to the first limb 34a of the two levers 34. The connection plate 41 is slidably mounted upon the shaft 18. The levers 34 are substantially Z-shaped and each is pivotable about its first joint 42. Consequently the angle between the first and second limbs 34a,34b of the lever, and therefore the degree of "openness" of the shape of the lever 34, can be changed. When the handle 39 is disposed so that its free end 40 lies proximate the base 37 of the shaft 18, the levers 34 are substantially a closed Z-shape as shown in FIG. 7. When the handle 39 is disposed so that its free end 40 lies proximate the supports 19, the levers 34 are substantially an open Z-shape as shown in FIG. 12. As will be obvious to those skilled in the art, the gearing of the apparatus can be set up so that when the free end 40 of the handle lies proximate the base 37 of the shaft the levers 34 are substantially an open Z-shape; and when the free end 40 of the handle lies proximate the supports 19 the levers 34 are substantially a closed Z-shape. The levers 34 consequently act in an accordian-like fashion. As the angle between the second and third limbs 34b,34c of the levers 34, i.e. the angle of the second joint 43, is substantially fixed, when the rod 35 is actuated, the third limb 34c pivots about the second joint 43.

Referring to FIGS. 7 and 12, a slot 44 is disposed in the first plate 20 in an area partially coincident with the hole 24. The plunger 25 is fixedly connected to the third limb 34c of the lever 34 by a suitable attachment means 45. When the free end 40 of the handle 39 is moved towards the supports 19, the third limb 34c is pivoted about the second joint 43. The plunger 25 is forced to move along the hole 24 and into engagement with the latch 27. As one face 46 (FIG. 10) of the latch 27 is inclined at an angle, the plunger 25 rides along the face 46, pushing the latch 27 from the aperture 26 and the coincident portion of the hole 24. If an anchor 10 is clamped against the third plates 22 when the plungers 25 engage the latches 27, the arms 11 and/or projections 13 of the anchor 10 are forced out of the slots 23 in the direction of the movement of the plungers 25, i.e. towards each other. When the free end 40 of the handle 39 is moved in the opposite direction, the levers 34 are pivoted by the rod 35 about the second joints 43 in the opposite direction and the plungers 25 are moved along the holes 24 in the opposite direction and disengage from the latches 27. This allows the latches 27 to reenter the apertures 26 and coincident portions of the holes 24.

Figure 13:
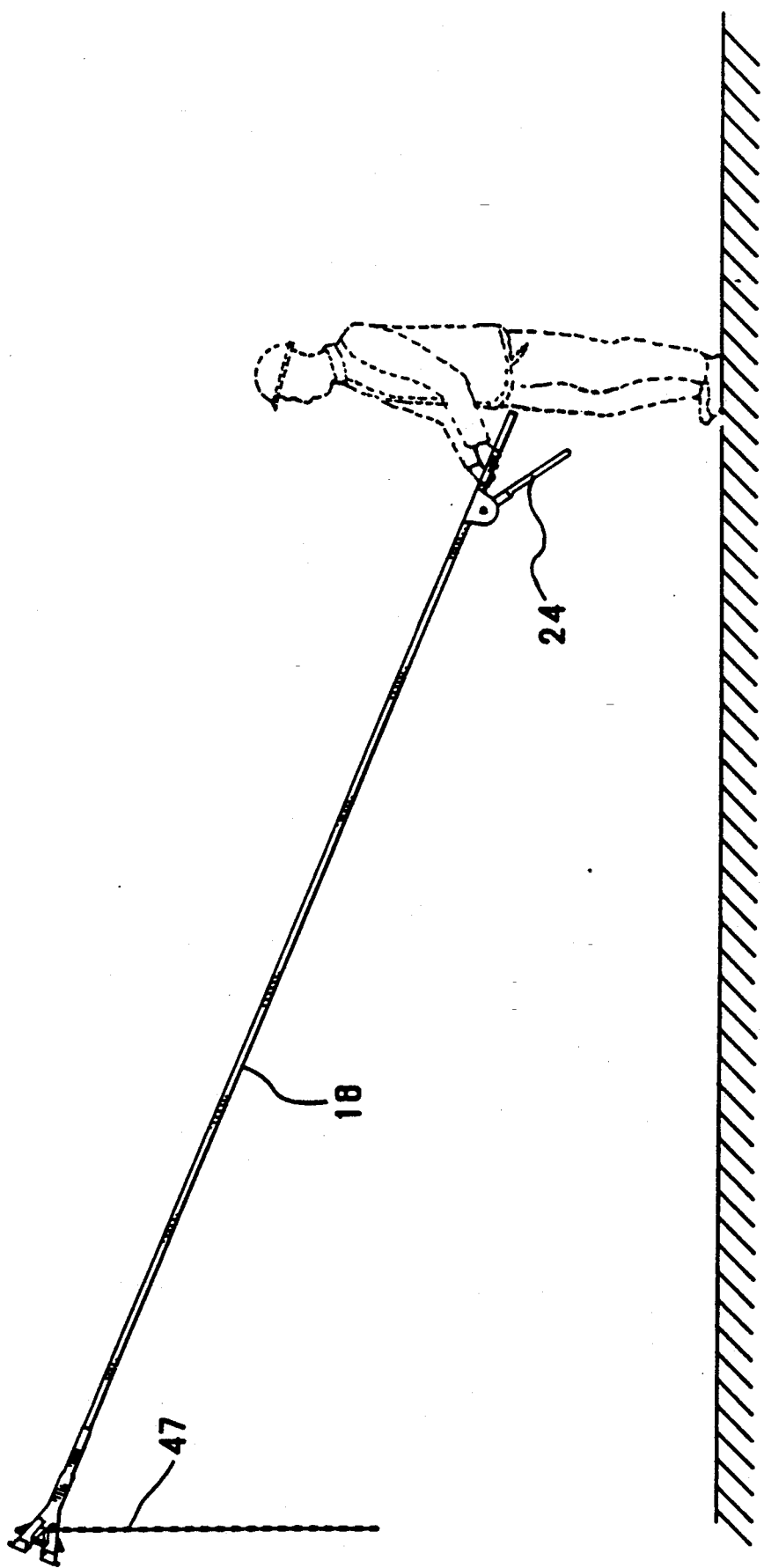
FIGS. 13–15 are diagrammatic views showing the installation of an anchor means in tin pan decking using the apparatus.
Figures 14, 15:
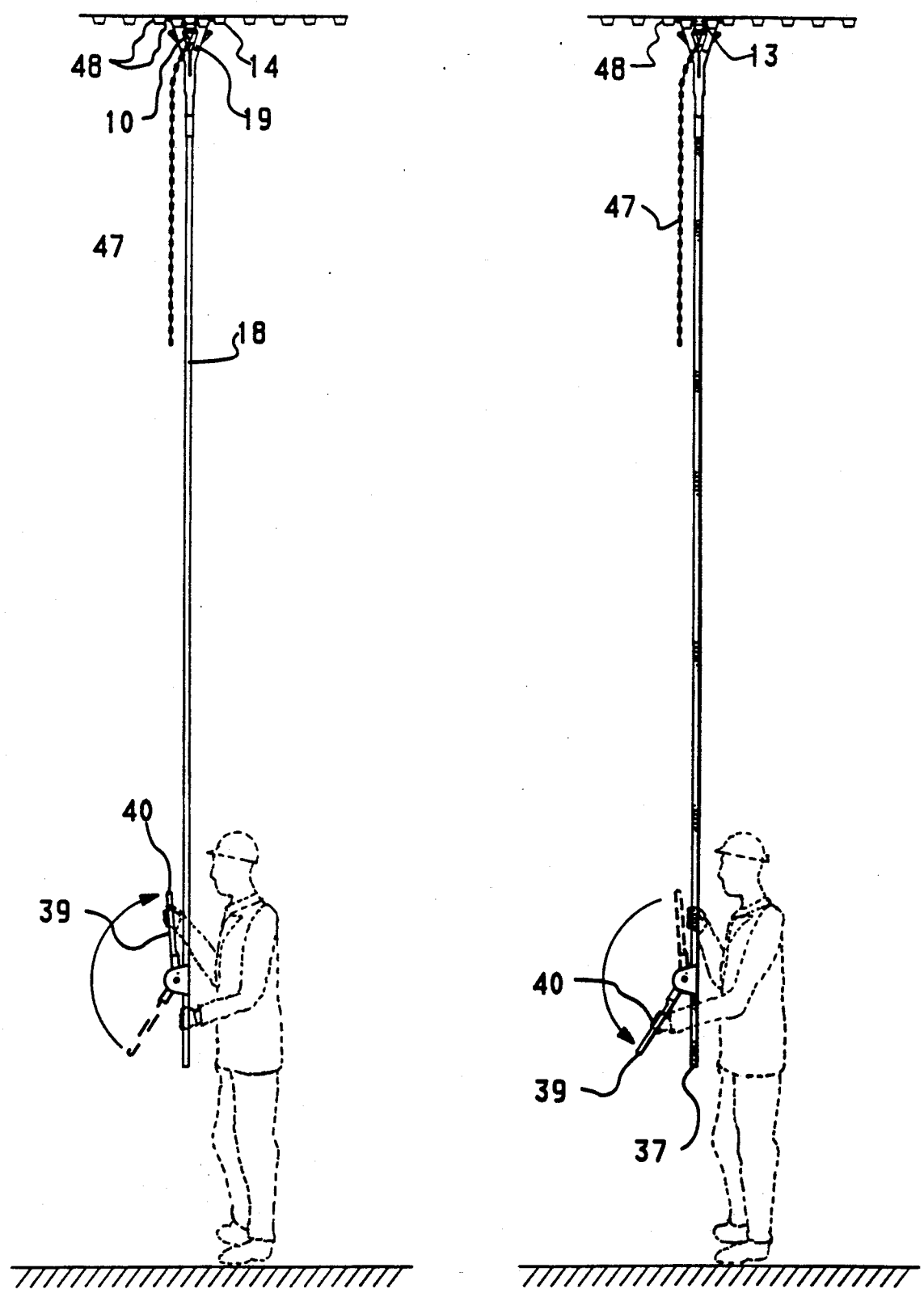

The present invention is used in the following manner:

Referring to FIGS. 13-15, the user attaches the load in the anchor 10. If for example a chain 47 is to be suspended from the anchor 10, the chain 47 is disposed in the apex area 16 (FIG. 1) of the V-shaped member. The lever arm 28 on a first support 19 is moved towards the first plate 20 of that support so that the latch 27 is withdrawn from the aperture 26 and coincident portion of the hole 24. The arm 11 and/or projection 13 of the anchor are inserted into the slot 23 and the lever arm 28 is released so that the latch 27 moves back into the aperture 26 and coincident portion of the hole 24, thereby clamping the arm 11 and/or projection 13 against the third plate 22. The same procedure is followed with respect to the second arm 11 of the anchor 10 and the second support 19 of the apparatus. The anchor 10 is now securely held in the supports of the apparatus. At this point the anchor 10 lies substantially parallel to the plane of the first, second and third plates 20,21,22.

The shaft 18 is extended upwardly so that the supports 19 are positioned close to the decking 14 and the projections 13 are disposed on either side of the desired U-shaped section 48 of the decking. The handle 39 is rotated so that its free end 40 lies proximate the supports 19. This movement causes the levers 34 to pivot, moving the plungers 25 along the holes 24 so that they engage the latches 27. The latches 27 are forced to withdraw from the apertures 26 and coincident portions of the holes 24, and the arms 11 of the anchor are thereby released and move in the same direction as the plungers 25, i.e. towards each other. The projections 13 of the anchor 10 are driven into the upwardly extending portions of the U-shaped section 48 of the decking. The projections 13 lodge themselves in the U-shaped section 48 by virtue of the contracting spring action of the anchor 10. The handle 39 is rotated so that the free end 40 lies proximate the base 37 of the shaft 18. The shaft 18 is lowered, the next load is placed in the next anchor, that anchor is clamped into the apparatus and the process is repeated.

The anchors 10 can be installed in the tin pan decking by one workman at ground level and the apparatus permits the workman to install anchors relatively quickly and easily.

While the invention has been described in conjunction with specific embodiments thereof, it is evident that many alternatives, modifications, and variations will be apparent to those skilled in the art in the light of the foregoing description. Accordingly, it is intended to embrace all such alternatives, modifications and variations, as fall within the spirit and broad scope of the appended claims.

The embodiments of the invention in which an exclusive property or privilege is claimed are defined as follows:

1. An apparatus for installing an anchor means in a supporting structure, said anchor means comprising a substantially V-shaped member having diverging arms, each arm extending to an end and having a gripping means disposed proximate the end of each arm for engaging the supporting structure, said apparatus comprising:

a shaft having grasping means mounted at one end thereof, said grasping means being configured to hold said anchor means therein, said grasping means comprises two support members disposed a spaced distance from each other in the same plane, each support member having a slot therein for receiving the arms of said anchor means; the slots being so disposed that when an anchor means is held by the grasping means, said anchor means lies substantially parallel to the plane of said support members; and a securing means mounted on each of said support members, said securing means being adapted to releasably engage an arm of an anchor means disposed within the slot; each support member comprises first, second and third plates lying substantially parallel to each other and abutting each other; said first plate being secured to said shaft, and said second and third plates being secured to said first plate in such a manner that said second plate is disposed between said first and third plates; said second plate being smaller than either the first or third plate so that said slot is formed between said first and third plates, the anchor means being receivable within this slot;

anchor disengagement means mounted on said shaft and being adapted to engage said grasping means to cause the anchor means to be released therefrom.

2. An apparatus for installing an anchor means as defined in claim 1, wherein said second plate is comprised of two plate members which are disposed a spaced distance from each other, in the same plane, and said slot is defined by the spaced distance between the plate members.

3. An apparatus for installing an anchor means as defined in claim 2, wherein said second plate of each support member has faces which are substantially parallel to and abut said first and third plates; and said second plate has a hole disposed therein, said hole being disposed through said faces; and said third plate has an aperture disposed therein, said aperture being partially coincident with said hole; and wherein said securing means comprises:

a latch means mounted at substantially right angles to the first plate of each support member and being reciprocally movable through the coincident portion of the hole and the aperture;

each of said latch means being so configured that when an arm and/or gripping means of an anchor means is disposed within the slot of a support member, the latch means extends partially through said coincident portion of the hole and the aperture and clamps the arm against the third plate.

4. An apparatus for installing an anchor means as defined in claim 3, wherein said latch means is urged towards the third plate by a spring.

5. An apparatus for installing an anchor means as defined in claim 3 or 4, the apparatus further comprising a lever arm pivotally mounted on a bracket connected to the first plate; the lever arm further being connected to the latch means at one end and being adapted to remove the latch means from the coincident portion of the hole and the aperture when the opposite end of the lever arm is moved towards the first plate.

6. An apparatus for installing an anchor means as defined in claim 3, wherein said anchor disengagement means is engagable with said latch means to cause the arms and/or gripping means of a clamped anchor means to be released from the slots.

7. An apparatus for installing an anchor means as defined in claim 6, wherein said anchor disengagement means comprises:

a plunger disposed for reciprocal movement within the hole of the second plate;

a lever means fixedly secured proximate a first end to the plunger and pivotally connected proximate a second end to a gear means mounted on the shaft; so that upon actuation of said gear means, said lever means pivots causing the plungers to travel within the holes and into engagement with the latch means, thereby causing the latch means to retract from the aperture and the coincident portion of the hole.

8. An apparatus for installing an anchor means as defined in claim 7, wherein the latch means has a face for engagement by the plunger, and the face is inclined at an angle so that as the plunger engages the latch means, the plunger rides along the face and pushes the latch means away from the third plate out of the aperture and coincident portion of the hole and back towards the first plate.

9. An apparatus for installing an anchor means as defined in claim 7, wherein each lever means is substantially Z-shaped, having first and second limbs pivotally connected to each other at a first joint; and having second and third limbs fixedly connected to each other at a second joint; the first limb being secured to the gear means by a rod and the third limb being secured to the plunger.

10. An apparatus for installing an anchor means as defined in claim 9, wherein the angle between the first and second limbs is variable in response to movement of the gear means; so that when the gear means is actuated, the angle between the first and second limbs is changed and the third limb is caused to rotate about the second joint and move the plunger within the hole.

11. An apparatus for installing an anchor means as defined in claim 7, said apparatus further comprising a handle pivotally mounted on the shaft and being engagable at one end with the gear means, and being rotatable by an operator grasping the opposite free end; so that if the free end of the handle is rotated in a first direction, the levers are pivoted so that the plungers move within the holes into engagement with the latch means; and if the free end of the handle is rotated in a second direction, the levers are pivoted so that the plungers move within the holes out of engagement with the latch means.

12. An apparatus for installing an anchor means as defined in claim 11, wherein the gripping means of each anchor means comprises a projection which extends from the end of each arm; the projections extending towards each other, and the projections and arms of the V-shaped member being substantially aligned in the same plane; and when the plunger moves into engagement with the latch means, the projections are moved towards each other and if the supports of the apparatus are disposed on either side of a U-shaped channel of tin pan decking, the projections are driven into the U-shaped channel.

* * * * *